(12) United States Patent
Christensen et al.

(10) Patent No.: US 7,400,449 B2
(45) Date of Patent: Jul. 15, 2008

(54) SYSTEM AND METHOD FOR REDUCTION OF IMAGE ARTIFACTS FOR LASER PROJECTORS

(75) Inventors: Robert R. Christensen, Salt Lake City, UT (US); Forrest L. Williams, Sandy, UT (US); Allen H. Tanner, Sandy, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 0 days.

(21) Appl. No.: 11/541,154

(22) Filed: Sep. 29, 2006

(65) Prior Publication Data

US 2008/0080054 A1    Apr. 3, 2008

(51) Int. Cl.
*G02B 5/18* (2006.01)
*G02B 27/44* (2006.01)

(52) U.S. Cl. ..................... 359/566; 359/558
(58) Field of Classification Search .......... 359/566, 359/558
See application file for complete search history.

(56) References Cited

U.S. PATENT DOCUMENTS

| | | | |
|---|---|---|---|
| 3,633,999 A | 1/1972 | Buckles | |
| 5,272,473 A | 12/1993 | Thompson et al. | |
| 5,410,371 A | 4/1995 | Lambert | |
| 5,982,553 A | 11/1999 | Bloom et al. | |
| 6,323,984 B1 | 11/2001 | Trisnadi | |
| 6,577,429 B1* | 6/2003 | Kurtz et al. | 359/279 |
| 6,738,105 B1 | 5/2004 | Hannah et al. | |
| 6,747,781 B2 | 6/2004 | Trisnadi | |
| 6,956,878 B1 | 10/2005 | Trisnadi | |
| 6,971,576 B2 | 12/2005 | Tsikos et al. | |
| 2003/0081303 A1 | 5/2003 | Sandstorm et al. | |
| 2004/0183954 A1 | 9/2004 | Hannah et al. | |
| 2005/0243389 A1 | 11/2005 | Kihara | |
| 2006/0221429 A1* | 10/2006 | Christensen et al. | 359/279 |

FOREIGN PATENT DOCUMENTS

| | | |
|---|---|---|
| WO | WO 01/57581 | 8/2001 |
| WO | WO 02/31575 | 4/2002 |
| WO | WO 03/001281 | 1/2003 |

OTHER PUBLICATIONS

Trisnadi, Jahja, "Speckle contrast reduction in laser projection display," pp. 1-7, sunnyvale, CA 94089.

* cited by examiner

*Primary Examiner*—Joshua L Pritchett
(74) *Attorney, Agent, or Firm*—Thorpe North & Western LLP

(57) ABSTRACT

A system and method is disclosed for reducing visibility of image artifacts caused by diffractive elements in a laser projector having a structured diffractive device. At least two diffracted orders of light can be selected from light emitted from the structured diffractive device using a spatial light filter. The polarization of at least one of the selected diffracted orders can be changed with respect to another selected diffracted order. The selected diffracted order can be recombined to form an image having reduced visible image artifacts.

21 Claims, 3 Drawing Sheets

SYSTEM AND METHOD FOR REDUCTION OF IMAGE ARTIFACTS FOR LASER PROJECTORS

FIELD OF THE INVENTION

The present invention relates generally to the field of coherently illuminated systems. More particularly, the present invention relates to the reduction in visibility of image artifacts caused by diffractive elements and scatter in laser illuminated projection systems.

BACKGROUND

Laser speckle can be caused by interference patterns generated when coherent light illuminates a rough surface. Reflection from the rough surface can create a diffuse reflection. Transmission through the rough surface creates a diffuse transmission. When light hits a rough surface diffuse reflection and/or diffuse transmission occurs and light scatters in various directions. A laser projector uses a coherent laser beam as its light source. When the laser beam from the projector hits the display screen, the light reflects off the surface at various angles and random spatial interference of the coherent laser light with itself occurs. The resulting interference of the coherent light source causes constructive and destructive interference. To the human eye, this image artifact appears as a speckle pattern. These artifacts can cause reduced contrast and resolution of an image in a laser based projection system.

Diffraction can cause another image artifact to occur with laser projectors that use diffractive elements, such as the Grating Light Valve (GLV) modulator described in U.S. Pat. No. 5,982,553. Whereas speckle is caused by interference of the light scattered from the screen, the diffractive elements in the path of a laser beam can cause an interference pattern in the light incident on the screen. This pattern may be visible to the viewer as repeating dark and bright horizontal lines, and it is caused by the interference between diffracted orders after they are recombined.

Several attempts have been made to reduce the effects of laser speckle on image quality. U.S. Pat. No. 3,633,999 discloses the use of a beam splitter to separate a laser beam into two beams. The beams are recombined after the optical path length of one beam has been increased by greater than a coherence length of the laser. Because the two beams are no longer coherent, the re-combined beam can produce less speckle when it is reflected off of a surface such as a screen. However, this method is only effective for lasers that have a short coherence length. An instrument can become difficult to package as the coherence length increases.

U.S. Pat. No. 6,323,984 discloses the use of phase gratings for mitigating the effects of laser speckle on image quality of laser-based projectors that produce a two dimensional image by scanning a line image across a diffuse surface. The phase grating disclosed is a simple two-dimensional pattern consisting of a repeated arrangement of lines of phase delay. A later publication by the inventor [J I Trisnadi, "Speckle-contrast reduction in laser-projection displays," in *Projection Displays VIII*, Proc. SPIE 4657, M H Wu, Editor (Soc. Photo-Opt. Instru. Engrs., Bellingham, Wash., 2002), pp. 131-137], describes a more sophisticated configuration using so-called Hadamard matrices to achieve a greater reduction in speckle contrast. The Hadamard matrix phase grating can be vibrated to further reduce the speckle contrast by moving the phase grating relative to the line image for each scan of the projector, where the eye integrates together several sequential scans. However, use of the phase gratings can result in a loss of light when the laser beam is diffracted into higher order diffraction orders with angles that can be too great to be collected by the optics. Further, while the phase grating can reduce speckle contrast, use of phase gratings can also create objectionable interference patterns on the screen. Use of the phase gratings can merely result in trading one image artifact for another.

U.S. Pat. No. 6,738,105 discloses the use of a phase array system to remove the perception of speckle. This patent, however, does not discuss eliminating interference artifacts in a displayed image that are caused by the use of diffractive elements.

SUMMARY

A system and method is disclosed for reducing visibility of image artifacts caused by diffractive elements in a laser projector having a structured diffractive device. At least two diffracted orders of light can be selected from light emitted from the structured diffractive device using a spatial light filter. The polarization of at least one of the selected diffracted orders can be changed with respect to another selected diffracted order. The selected diffracted order can be recombined to form an image having reduced visible image artifacts.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Figure 1:
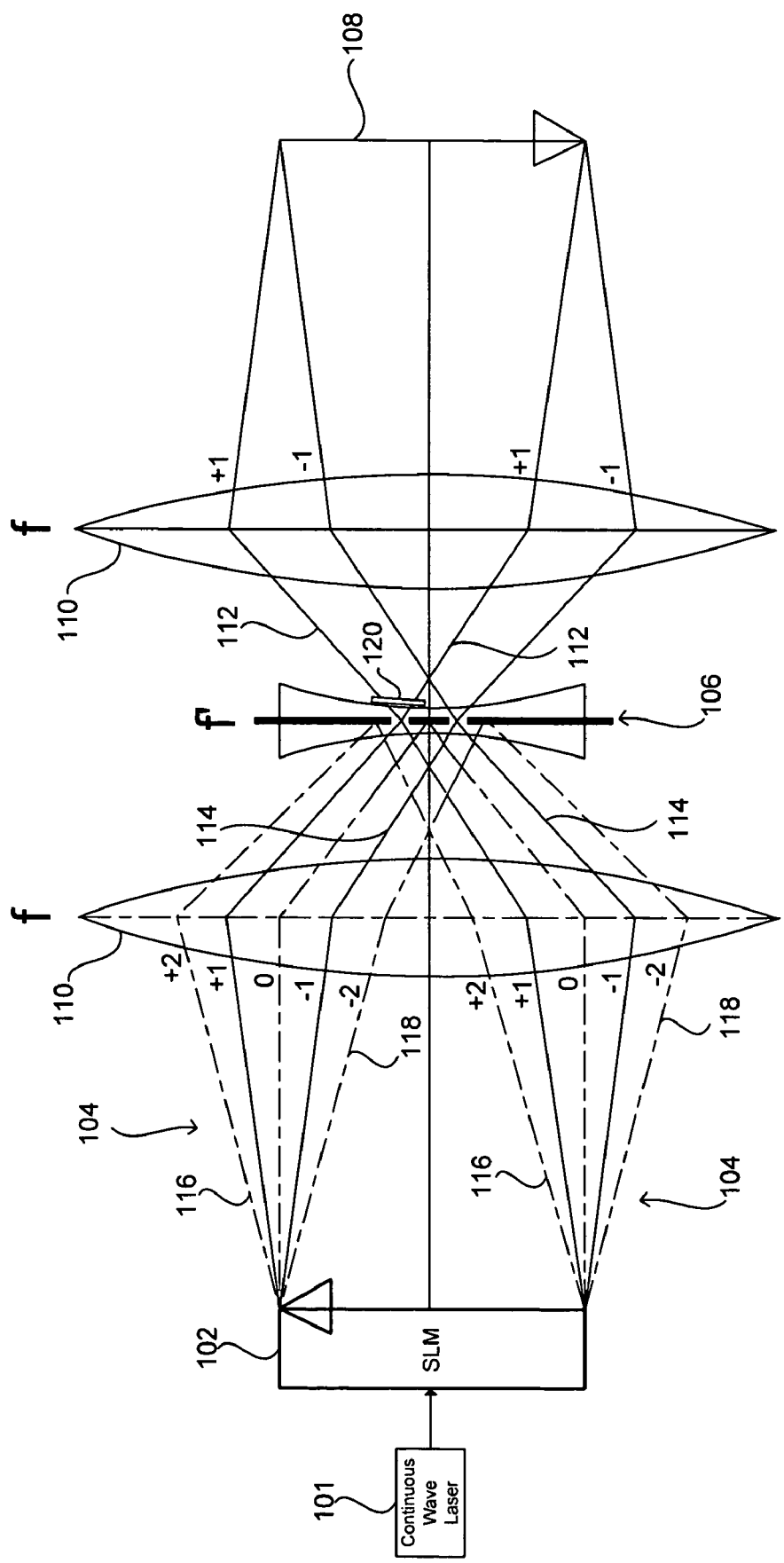
FIG. 1 is an illustration of a system employing a spatial light modulator and a spatial filter in accordance with an embodiment of the present invention.

In order to overcome the problems described and to provide an efficient system for reducing visual obscurities in a laser projection system, the present invention provides an apparatus and method for reducing laser speckle and interference patterns in a laser projector display when using a laser projector having a spatial light modulator as illustrated in FIG. 1. The spatial light modulator can be an electro-optic SLM, a photoconductor-liquid crystal SLM, or a photoconductor-deformable mirror SLM. For example, in one embodiment the SLM can be a grating light valve (GLV).

FIG. 1 illustrates an example embodiment of the present invention wherein light is diffracted from a spatial light modulator 102. While FIG. 1 shows an example embodiment having transmissive lenses, it should be appreciated that a system could also be incorporated using reflective mirrors.

When coherent light, such as light from a continuous wave laser, is transmitted or reflected from a structured diffractive device, such as a grating light valve, it is diffracted into multiple angles or orders 104, as shown in FIG. 1. The incident beam of laser light essentially becomes multiple beams of varying angle and intensity. Higher order beams normally have less intensity than lower order beams and are diffracted at greater angles.

The orders, or beams, typically maintain the same polarization as the incident beam. If optical elements are used to recombine these beams, or orders, to form an image, interference between the coherent beams will create dark and bright fringes, or interference artifacts, in the image. These interference artifacts can be objectionable to a viewer because they decrease the contrast and resolution of the image.

In at least one embodiment, the invention disclosed herein reduces the visibility of such artifacts in the image. The disclosed system(s) and method(s) can take place near a Fourier plane, where orders of light are focused such that there is minimal overlap between the beams. In this plane, each beam can be separately operated on without causing scatter or diffraction. This is possible because the beams of light are substantially spaced apart in separate orders at the Fourier plane.

A spatial filter 106, such as a Schlieren filter, can be used to block some orders 104 and allow others to pass. The spatial filter can be placed in the Fourier plane. In one embodiment, the spatial filter can be configured to pass only the positive and negative first order beams. After the spatial filter, the +1 and −1 orders can be recombined using a lens or beam combiner to form an intermediate image 108. Interference between the two coherent beams can create dark and bright fringes, or interference artifacts, in the intermediate image. For a laser projector employing a grating light valve type SLM, these fringes are generally seen as horizontal bright or dark lines in the image.

The interference artifacts can be substantially reduced or eliminated by changing a polarization of one or both of the coherent beams. In one embodiment, the polarization can be changed such that the two beams are substantially orthogonally polarized. Recombining the orthogonally polarized beams can result in an image with substantially reduced interference artifacts because the orthogonal polarizations enable the beams to be combined with little to no interference with each other. The fringes in the image become substantially reduced or disappear altogether.

The change in polarization of the two orders can be optimally achieved where each beam can be operated on wholly, such as at or near a Fourier plane. Performing the change in polarization when the beams are substantially separate can significantly reduce cross-talk and scattered light.

In one embodiment, a single beam of collimated laser light is diffracted by the spatial light modulator 102 into a plurality of beams comprising multiple orders of substantially coherent light. A focusing device comprising one or more optical elements 110 can be used to enable the plurality of beams to be focused at the Fourier plane of the one or more optical elements. In one embodiment, the one or more optical elements 110 can be an Offner relay.

As previously disclosed, a spatial filter 106 can be located substantially near the Fourier plane. In one embodiment, two of the multiple orders, such as the +1 order 112 and the −1 order 114, can be transmitted by the spatial filter, while the remaining orders are substantially blocked. One or both of the two transmitted orders can be modified such that their polarizations are orthogonal to one another.

Modifying the selected orders to obtain substantially orthogonal polarization of the relative beams can be accomplished using a polarization altering device 120. For example the polarization altering device can be a quarter-wave plate that is placed in the path of one of the beams when using a reflective spatial filter. Alternatively, a half-wave plate can be located in the path of one of the beams, such as the +1 order 112 or −1 order 114, when using a transmissive filter. The quarter-wave or half-wave plate can be placed within the beam path near the spatial filter 106 which is located substantially near the Fourier plane. Placing the polarization altering device near the Fourier plane enables the beams to be modified at a point at which the beams are substantially separate from adjoining orders or beams. This allows the beams to be modified with minimal interference from adjoining beams, which minimizes cross-talk and scatter, as previously disclosed.

Polarization of one or both of the beams can also be accomplished near the Fourier plane by using a coating on the spatial filter 106. The coating can be located on a portion of the filter near where one of the orders, such as about the area where the +1 orders and the −1 orders contact the filter.

The substantially orthogonally polarized beams of the +1 order 112 and −1 order 114 can then be recombined to form an intermediate image 108 with minimal loss of light intensity or resolution in the intermediate image. As previously stated, the relative orthogonal polarization of the beams enables interference artifacts in the intermediate image to be substantially eliminated.

Figure 2:
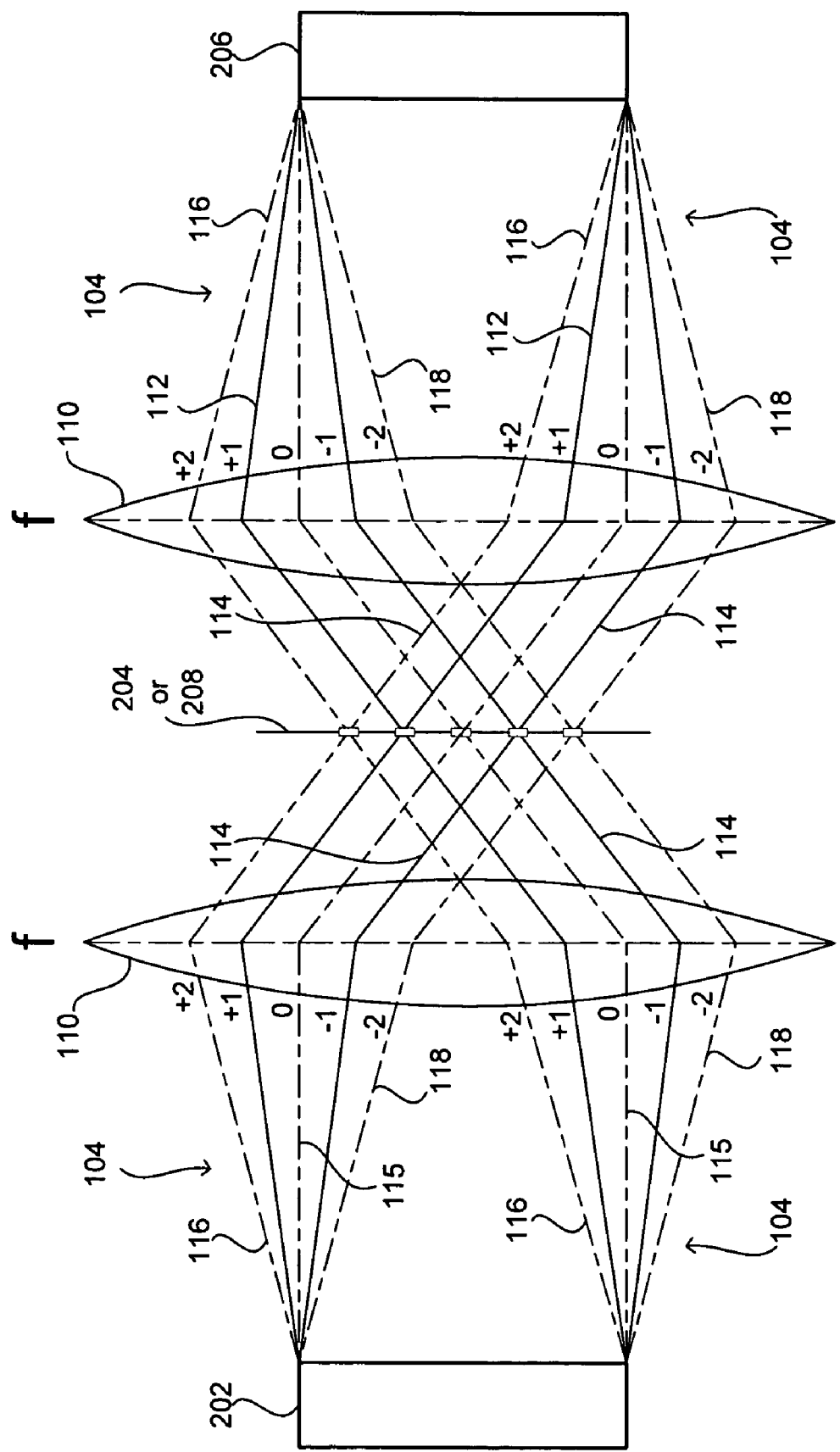
FIG. 2 is an illustration of a system for dynamically changing polarization or phase of multiple diffracted beams in accordance with an embodiment of the present invention.

In another embodiment, multiple orders of light 104 can be transmitted at the Fourier plane instead of only two. For example, the ±1 orders 112 and 114 can be transmitted, along with the zero order 115 and the ±2 orders 116 and 118, as shown in FIG. 2. In this example embodiment, a phase-grating or other diffractive source 202 can cause multiple orders of light to be emitted. As in the previous example, one or more optical elements 110 can be used to enable the plurality of beams to be focused at the Fourier plane of the one or more optical elements. Each of the five orders of light cannot be orthogonal to all of the other orders. Therefore, a slightly different approach can be used to reduce visual artifacts.

As previously stated, interference artifacts appear on a display screen of a coherent image projection device, such as a laser projector, as bright or dark lines in the image. The interference images of three or more orders may not be able to be totally eliminated since each of the orders cannot be substantially orthogonal to every other order. However, by changing the relative polarization of each of the transmitted or reflected orders, the location of the interference images on the screen can be altered. If the polarization changes can be implemented at a high enough rate (frequency), the bright or dark lines in the image can change location on the display screen within the eye's integration time. Thus, the image artifacts will be perceived as being blended together, resulting in reduced visibility of the interference patterns. The interference will not be totally eliminated in this embodiment, but the visibility will decrease as the number of different interference patterns integrated by the eye increases.

It should be noted that speckle will still be present in the image, because it is formed from the light reflected or transmitted by the screen upon which the image is displayed. The speckle pattern for an image with fringes is different than an image without fringes because different parts of the screen are illuminated. Therefore, as the number of different interference patterns integrated by the eye increases, the number of speckle patterns also increases. However, as with the interference patterns, the visibility of speckle patterns will decrease as the number of different interference patterns integrated by the eye increases and the overall speckle patterns are integrated by the eye. Thus, dynamically altering the polarization of multiple orders, such as the 0, ±1, and ±2 orders, can reduce the visibility of both interference patterns and speckle patterns visible on a display screen.

Dynamic changes in polarization of the plurality of beams can be accomplished by changing the polarization of two or more of the orders (beams) at a fast enough rate to change the interference patterns within the eye's integration time. For example, the polarization of the beams can be changed at least every 50 milliseconds. In another embodiment, the polarization can be changed at a much more rapid rate to enable individual pixels to have different polarization patterns, instead of entire rows of a projected image. This will be discussed more fully below.

In one embodiment, the dynamic polarization can be electronically controlled using a polarization altering device 204 such as an electro-optic device to change the polarization of the multiple beams or orders of light relative to one another. The polarization of two or more of the beams can be modulated using the electro-optic devices. Each beam can be modulated at a different frequency than the other beams. The diffracted orders can then be recombined to form an image 206 having a reduced amount of interference patterns.

However, applying dynamic polarization to the beams can introduce additional image artifacts in an image. For example, depending on the type of modulation used to alter the polarization, frequency artifacts can become visible in the image due to non-random changes in the polarization of a single beam, or complex interactions due to modulation of two or more beams.

One method for reducing or substantially eliminating frequency artifacts is to modulate the polarization of the two or more beams using a pseudorandom modulation scheme. For example, in one embodiment, electro-optic devices can be used to modulate the polarization of two or more of the multiple orders of light, such as the ±1 orders and the ±2 orders. The polarizations of the two or more beams can each be modulated with a different pseudorandom bit stream. Each pseudorandom bit stream can be mathematically orthogonal. Unlike the orders of light, where only two beams can be orthogonal to each other, a large number of pseudorandom bit streams can each be orthogonal to the other bit streams.

The large number of mathematically orthogonal pseudorandom bit streams allows a plurality of different modulation schemes to be used, enabling a plurality of beams or orders to each be modulated at a fast enough rate to change the interference patterns within the eye's integration time. Modulating the polarization of each of the beams using an orthogonal pseudorandom bit stream can substantially reduce or eliminate frequency artifacts in the image caused by the modulation. The ability to apply an orthogonal modulation scheme to each beam enables a larger number of different interference patterns to be generated which facilitates increased integration by the eye and substantially reduces perceived interference artifacts. The plurality of dynamic polarizers can be used in conjunction with the spatial filter 106 of FIG. 1. For example, the odd diffracted orders ±1, ±3 may be selected and then modulated.

A phase modulator can also be placed within an optical path of one or more of the multiple orders of light to enable a phase delay to be introduced into the system, as disclosed in U.S. application Ser. No. 11/097,462, which is herein incorporated by reference. One or more of the individual beams or orders of light can be offset or/delayed relative to the other beams, such as a λ/2 or a ¾λ phase delay. The offset can enable the orders to be recombined offset relative to one another which can enable a substantially reduced phase cancellation effect. The reduced cancellation effect can reduce image artifacts as well as increase the number of uncorrelated speckle, which further reduces speckle contrast.

In one embodiment, a plurality of phase modulators 208 can be configured to oscillate the phase of at least one of the orders with an amplitude sufficient to create a phase delay of about half a wavelength of the laser output 101 (FIG. 1). The phase modulator can be configured to operate at a frequency at least twice that of a laser projector's pixel rate. The phase modulator may be required to oscillate the phase of the one or more orders of light at a frequency much greater than the laser projector's pixel rate, depending on whether there are diffractive elements used within the laser projector. In order to function at a high rate of change, the phase modulator may be an electro-optic phase modulator.

Similarly, the electro-optic polarization modulators can be modulated at a frequency much greater than the laser projector's pixel rate. Increasing the frequency of the polarization modulators can enable the polarization to be changed for each pixel displayed on a screen. This can substantially increase the level of integration perceived by the eye and reduce large image artifacts such as more noticeable line artifacts in a display.

Figure 3:
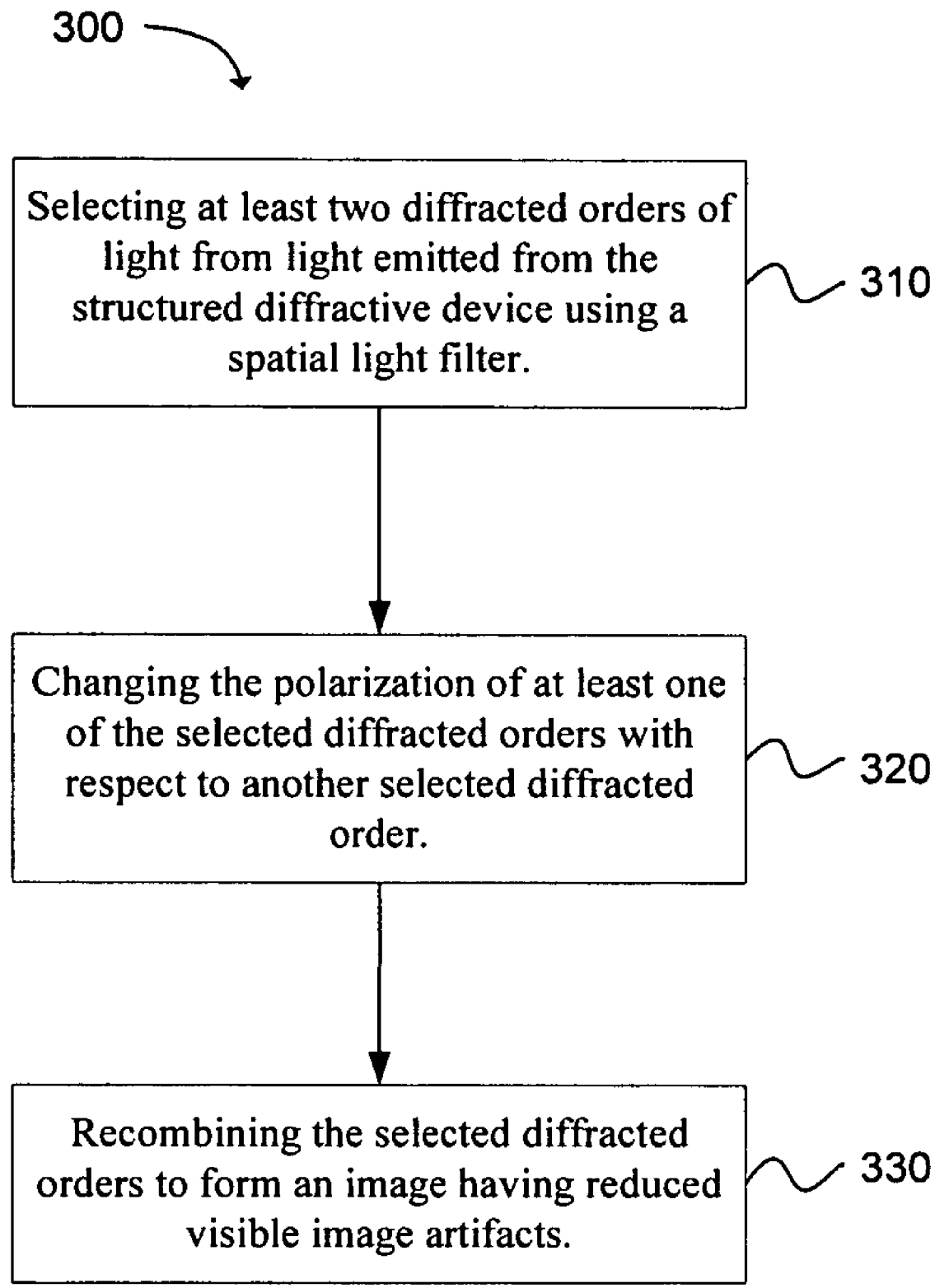
FIG. 3 is flow chart depicting a method for reducing visibility of image artifacts caused by diffractive elements in a laser projector having a structured diffractive device in accordance with an embodiment of the present invention.

A further embodiment includes a method 300 for reducing visibility of image artifacts caused by diffractive elements in a laser projector having a structured diffractive device, as shown in FIG. 3. The method includes the operation of selecting at least two diffracted orders of light from light emitted from the structured diffractive device using a spatial light filter, as shown in block 310. The spatial light filter can be located substantially near a Fourier plane. This enables operations to be implemented on individual orders of the diffracted light with minimal interference caused by the additional orders.

The method 300 further includes the operation of changing the polarization of at least one of the selected diffracted orders with respect to another selected diffracted order, as shown in block 320. In one embodiment the polarization can be made orthogonal to the polarization of another selected diffracted order. In another embodiment, the polarization of two or more diffracted orders can be actively modulated fast enough to average potential interference patterns within the eye's integration time. The modulation can be accomplished using pseudorandom bit streams to allow each of the modulated beams to have substantially orthogonal modulation. This can reduce image artifacts introduced by the active modulation.

The method 300 includes an additional operation of recombining the selected diffracted orders to form an image having reduced visible image artifacts, as shown in block 330. Whether the selected diffracted orders are orthogonally polarized or actively polarized, the method disclosed enables the diffracted orders to be recombined with reduced visible image artifacts within the image.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for reducing visibility of image artifacts caused by diffractive elements in a laser projector having a structured diffractive device, comprising:

selecting at least two diffracted orders of light from light emitted from the structured diffractive device using a spatial light filter;

changing a polarization of at least one of the selected diffracted orders with respect to another selected diffracted order; and recombining the selected diffracted orders to form an image having reduced visible image artifacts.

2. A method as in claim 1, wherein selecting at least two diffracted orders of light further comprises selecting at least two diffracted orders of light emitted from a grating light valve using a spatial light filter located substantially near a Fourier plane.

3. A method as in claim 1, wherein selecting at least two diffracted orders of light further comprises selecting at least two diffracted orders of light emitted from a spatial light modulator using a spatial light filter located substantially near a Fourier plane.

4. A method as in claim 1, wherein selecting at least two diffracted orders of light further comprises selecting at least two diffracted orders of light emitted from a structured diffractive device using a spatial light filter located substantially near a Fourier plane, wherein the spatial light filter is a Schlieren filter.

5. A method as in claim 1, wherein selecting at least two diffracted orders of light further comprises selecting a +1 diffracted order and a −1 diffracted order.

6. A method as in claim 1, further comprising focusing the at least two diffracted orders of light from light emitted from the structured diffractive device onto the spatial light filter using an Offner relay.

7. A method as in claim 1, wherein changing a polarization of at least one of the selected diffracted orders further comprises orthogonally polarizing the at least one selected diffracted order with respect to another selected diffracted order.

8. A method as in claim 1, wherein changing a polarization of at least one of the selected diffracted orders further comprises orthogonally polarizing at least one of the selected diffracted orders using a quarter wave plate in a path of at least one of the selected diffracted orders.

9. A method as in claim 1, wherein changing a polarization of at least one of the selected diffracted orders further comprises orthogonally polarizing at least one of the selected diffracted orders using a half wave plate in a path of at least one of the selected diffracted orders.

10. A method as in claim 1, wherein changing a polarization of at least one of the selected diffracted orders further comprises orthogonally polarizing at least one of the selected diffracted orders using a half wave plate in a path of the at least one selected diffracted order by applying an optical coating on at least a portion of the spatial light filter.

11. A method as in claim 1, wherein changing a polarization of at least one of the selected diffracted orders further comprises orthogonally polarizing at least one of the selected diffracted orders using a quarter wave plate in a path of at least one of the selected diffracted orders.

12. A method as in claim 1, further comprising changing the polarization of at least two diffracted orders using an electro-optic device configured to dynamically change the polarization of the at least two diffracted orders with respect to each other.

13. A method as in claim 12, further comprising changing the polarization of the at least two diffracted orders at a rate that is faster than a human eye's integration time using the electro-optic device.

14. A method as in claim 13, further comprising changing the polarization of the at least two diffracted orders at a rate of at least one change in polarization every 50 milliseconds.

15. A method as in claim 1, further comprising changing the polarization of at least two diffracted orders using an electro-optic device to modulate the at least two diffracted orders using a different orthogonal pseudorandom bit stream to modulate each of the at least two diffracted orders.

16. A method as in claim 1, further comprising adding a phase delay to at least one of the selected diffracted orders to increase a number of uncorrelated speckle patterns on a display screen.

17. A method as in claim 1, further comprising adding a phase delay of $\lambda/2$ to at least one of the selected diffracted orders to increase a number of uncorrelated speckle patterns on a display screen.

18. A method as in claim 1, further comprising adding substantially random variations in phase delay to at least one of the selected diffracted orders to increase a number of uncorrelated speckle patterns using an electro-optic phase delay device.

19. A system for reducing visibility of image artifacts caused by diffractive elements in a laser projector, comprising:

a structured diffractive device;

a focusing device configured to receive light from the structured diffractive device and focus the light to a desired location;

a spatial filter located at a Fourier plane of the focusing device, wherein the spatial filter is configured to select at least two diffracted orders of light from the structured diffractive device;

a polarization altering device configured to change a polarization of at least one of the selected diffracted orders with respect to another selected diffracted order; and a beam combiner configured to recombine the selected diffracted orders to form an image having reduced visible image artifacts.

20. A system as in claim 19, wherein the beam combiner is an imaging lens.

21. A system for reducing visibility of image artifacts caused by diffractive elements in a laser projector, comprising:

a means for selecting at least two diffracted orders of light from light emitted from the structured diffractive device using a spatial light filter;

a means for changing a polarization of at least one of the selected diffracted orders with respect to another selected diffracted order; and a means for recombining the selected diffracted orders to form an image having reduced visible image artifacts.

* * * * *